April 28, 1942. P. B. REEVES Re. 22,085

MULTIPLE-BELT VARIABLE SPEED UNIT

Original Filed Oct. 28, 1936

INVENTOR.
PAUL B. REEVES,
BY
Hood & Hahn.
ATTORNEYS

Reissued Apr. 28, 1942 Re. 22,085

UNITED STATES PATENT OFFICE 22,085

MULTIPLE-BELT VARIABLE SPEED UNIT

Paul B. Reeves, Columbus, Ind., assignor to Reeves Pulley Company, Columbus, Ind., a corporation of Indiana Original No. 2,111,077, dated March 15, 1938, Serial No. 107,921, October 28, 1936. Application for reissue December 15, 1941, Serial No. 423,084

12 Claims. (Cl. 74—230.17)

Figure 1:
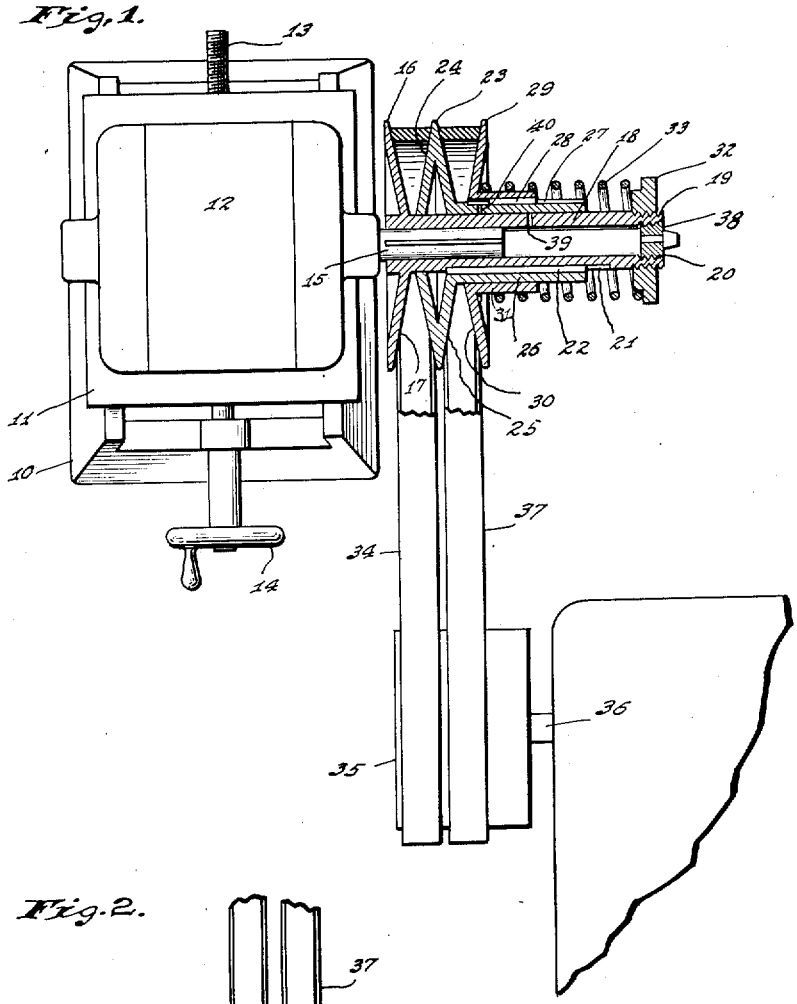

The present application relates to variable speed units of the type including a plurality of expansible V-pulleys, with which are associated V-belts for providing a simultaneous multiple drive between shafts. The primary object of my invention is to provide an organization of the above character in which the pulleys will automatically operate together, both in driving and in varying their effective diameters. A further object of the invention is to provide, in an organization of the above described character, novel arrangements of elements which will result in efficient operation, and which will reduce to a minimum any possibility of wear which might result in uneven operation of the various elements of the organization. Still further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 2:
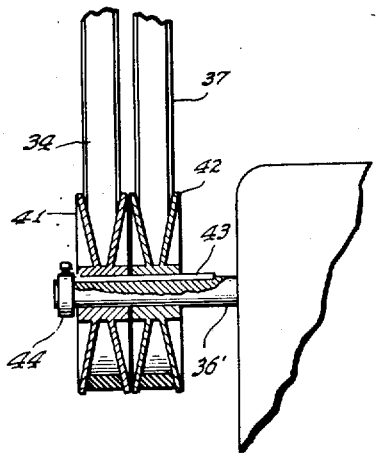

Fig. 1 is a plan view, more or less diagrammatic, of a variable speed unit of the character above specified, parts being shown in section for clarity of illustration, and Fig. 2 is a fragmentary plan of a portion of a modified form of the invention, parts being shown in section.

The organization which is illustrated is broadly similar to that disclosed and claimed in my prior reissued Patent No. 18,333. As in that patent, I have illustrated a base 10 upon which is slidably mounted a motor base plate 11 carrying a motor 12. The base plate is provided with an internally threaded lug (not shown) on its bottom, with which cooperates a screw shaft 13 journaled in the base 10 for rotation therein, but held against axial movement with respect thereto; a hand wheel 14 being provided for operating the screw shaft 13. Obviously, rotation of the screw shaft 13 will move the motor bed plate 11 and the motor 12 axially of the shaft 13.

The motor 12 is provided with the usual spindle 15 upon which is fixed a coned disc 16 having a coned face 17 facing away from the motor. From said coned face 17 there projects an elongated hub 18 which extends beyond the end of the spindle 15 and is provided at its remote end with external threads 19 and internal threads 20. The hub 18 is formed with one or more keyways 21 receiving keys 22 whereby a double-coned disc 23 is slidably but non-rotatably mounted upon said hub 18.

The disc 23 is formed with a coned face 24 disposed in facing relation to the coned face 17 of the disc 16. It will be obvious that the elements 16 and 23 cooperate to form an expansible V-pulley. Said disc 23 is likewise provided with an oppositely coned face 25; and from the face 25 there extends an elongated hub 26, terminating short of the outer end of the hub 18, and formed with keyways receiving the keys 22.

The hub 26 is likewise formed with one or more external keyways 27 receiving keys 28 whereby a coned disc 29 may be slidably but non-rotatably mounted upon said hub 26. The disc 29 is formed with a coned face 30 disposed in facing relation to the face 25 of the disc 23; and it will be clear that the discs 23 and 29 cooperate to form a second expansible V-pulley.

From the outer face of the disc 29 projects a hub 31 which is formed with suitable internal keyways for the reception of the keys 28. This hub 31 terminates short of the outer end of the hub 26.

An abutment element 32 is threadedly mounted on the external threads 19 of the hub 18, and forms a stop for one end of a spring 33, the opposite end of which bears against the disc 29 to urge the same toward the fixed disc 16.

A V-belt 34, having inclined lateral friction surfaces and a flat inner friction surface, is received between the coned faces 17 and 24 of the discs 16 and 23 respectively. The inclined friction faces of said belt 34 drivingly engage the coned faces 17 and 24; and the flat inner face of said belt drivingly engages a flat faced pulley 35 mounted upon a shaft 36 to be driven. A second belt 37, similar in all respects to the belt 34, has its inclined lateral friction surfaces drivingly engaged with the coned faces 25 and 30 of the respective discs 23 and 29; and has its flat inner surface drivingly engaged with the pulley 35.

The outer end of the hollow tube 18 is preferably closed by a lubricating fixture 38 through which lubricant may be injected into the interior of said hub, preferably under pressure. The hub 18 is formed with one or more radial apertures 39 therethrough, opening into the outer surface of said hub within the region occupied by the hub 26. This hub 26 is similarly provided with one or more radial apertures 40 therein, opening into the outer surface of said hub 26 within the region occupied by the hub 31.

It will be obvious that, if the hand wheel 14 is rotated in a counter-clockwise direction, as viewed from the bottom of the drawing, the motor 12 will be moved upwardly, thereby increasing the center distance between the shafts 15 and 36. Since the belts 34 and 37 are substantially inelastic, said belts will necessarily be forced, by such movement of the shaft 15, inwardly into the grooves formed between the faces 17 and 24 and the faces 25 and 30. As the belt 34 penetrates more deeply into the groove formed between the faces 17 and 24, it necessarily forces the disc 23 toward the right, since the disc 16 is fixed and the disc 23 is slidable. Such movement is transmitted, through the belt 37, to the disc 29; and the disc 29 is further moved toward the right as a result of penetration of the belt 37 more deeply into the groove between the faces 25 and 30.

Such movement of the discs 23 and 29 is opposed, of course, by the expansive tendency of the spring 33; but the spring 33 is of such strength as to permit that movement of the discs.

Obviously, as the belt 34 penetrates more deeply into the groove between the faces 17 and 24, the belt will be caused to move bodily toward the right; and it will drift toward the right across the flat face of the pulley 35. Similarly, as the disc 23 is moved toward the right, and as the belt 37 penetrates more deeply into the groove between the faces 25 and 30, the belt 37 likewise will be caused to move bodily toward the right, and it, also, will drift across the face of the flat faced pulley 35. Obviously, the degree of movement of the belt 37 will be considerably greater than the degree of movement of the belt 34.

Quite obviously, the above described adjustment of the organization will result in a reduction of the speed of the shaft 36; and an increase in the speed of that shaft can be effected by moving the motor 12 downwardly, as viewed in the drawing; whereupon the spring 33, acting through the disc 29 and the belt 37, will force the disc 29 and the disc 23 toward the left to squeeze the belts 34 and 37 outwardly in their respective grooves.

While I have illustrated an organization in which the expansible pulleys are carried on the driving shaft and the flat faced pulley is carried on the driven shaft, it will be clear that an opposite arrangement would be quite as feasible. In the same way, while I have illustrated merely a double belt drive, it will be quite clear that, within reason, the number of discs could be increased, whereby the number of belts used in the organization would be similarly increased, merely by adding further elements similar to the element 23; the sole essential being that each of the double coned discs between the single coned discs at the extremities of the series, shall be of such character that both faces will be moved simultaneously as a result of the movement of the associated belt closest to the fixed disc 16. It will also be understood that, while I have illustrated a single pulley 35 on the shaft 36, I might provide separate flat-faced fixed pulleys for the respective belts 34 and 37.

While, in the above discussion, I have referred exclusively to structures in which one of the shafts is driven by engagement of the inner flat faces of the belts 34 and 37 with a flat-faced pulley or pulleys, it will be clear that a plurality of non-expansive V-pulleys might be used in place of the flat-faced pulley, as illustrated in Fig. 1. In the organization of Fig. 2, the belts 34 and 37 drive, respectively, to non-expansible V-pulleys 41 and 42 mounted upon the shaft 36' through the medium of keys or splines 43. Obviously, both pulleys 41 and 42 must be capable of free axial movement along the shaft 36', in response to corresponding movement of the belts 34 and 37 as a result of variation of the center distance between the shafts 15 and 36'. A collar 44, or other suitable means, is provided to prevent movement of the pulley 41 to an undesired degree toward the left.

I claim as my invention:

1. In a device of the class described, a shaft, means for driving said shaft, a disc having a coned face fixed on said shaft, a second disc having two oppositely coned faces slidably but non-rotatably mounted with respect to said shaft adjacent said first disc, and a third disc having a coned face slidably but non-rotatably mounted with respect to said shaft in facing relation to said second disc, said three discs cooperating to form two expansible V-pulleys, spring means urging said third disc toward said first disc, a second shaft, a V-belt received between said first and second discs and passing over a pulley on said second shaft, and a second belt received between said second and third discs and passing over a pulley mounted on said second shaft, and means for varying the spacing of said discs from each other.

2. In a device of the class described, a shaft, means for driving said shaft, a disc having a coned face fixed on said shaft, a second disc having two oppositely coned faces slidably but non-rotatably mounted with respect to said shaft adjacent said first disc, and a third disc having a coned face slidably but non-rotatably mounted with respect to said shaft in facing relation to said second disc, said three discs cooperating to form two expansible V-pulleys, spring means urging said third disc toward said first disc, a second shaft, a V-belt received between said first and second discs and passing over a pulley on said second shaft, and a second belt received between said second and third discs and passing over a pulley mounted on said second shaft, and means for varying the center distance between said shafts.

3. In a device of the class described, two parallel shafts, a series of expansible V-pulleys mounted on one of said shafts, one coned face of each of said pulleys being formed on an axially shiftable element forming also a coned face of the next adjacent pulley, a plurality of V-belts, one received in the groove of each of said V-pulleys, spring means tending to contract all of said pulleys, and pulley means on the other of said shafts, said belts forming a driving connection between said pulley means and said V-pulleys.

4. In a device of the class described, two parallel shafts, a series of expansible V-pulleys mounted on one of said shafts, one coned face of each of said pulleys being formed on an element forming also a coned face of the next adjacent pulley, a plurality of V-belts, one received in the groove of each of said V-pulleys, the outer coned element of the V-pulley at one end of said series being fixed to said one shaft, spring means bearing on the outer coned element at the other end of said series, and urging all of the elements of said series, through said belts, toward said fixed element, and pulley means on the other of said shafts, said belts forming a driving connection between said pulley means and said V-pulleys.

5. In a device of the class described, two parallel shafts, a series of expansible V-pulleys mounted on one of said shafts, one coned face of each of said pulleys being formed on an element forming also a coned face of the next adjacent pulley, a plurality of V-belts, one received in the groove of each of said V-pulleys, the outer coned element of the V-pulley at one end of said series being fixed to said one shaft, spring means bearing on the outer coned element at the other end of said series, and urging all of the elements of said series, through said belts, toward said fixed element, pulley means on the other of said shafts, said belts forming a driving connection between said pulley means and said V-pulleys, and means for varying the center distance between said shafts.

6. In a device of the class described, a shaft, a coned disc fixed on said shaft, at least one double-coned disc slidably but non-rotatably mounted with respect to said shaft, a coned disc slidably but non-rotatably mounted with respect to said shaft in facing relation to the adjacent coned face of that double-coned disc most remote from said fixed disc, V-belts received between adjacent oppositely-coned faces of said respective discs, and spring means bearing against said last-mentioned coned disc and urging the latter, and, through said belts, the double-coned discs, toward said fixed disc.

7. In a device of the class described, a shaft, a coned disc fixed on said shaft and having an elongated hub projecting from the coned face thereof, a double-coned disc slidably but non-rotatably mounted on said hub and having a hub projecting therefrom away from said first disc, a second coned disc slidably but non-rotatably mounted on the hub of said double-coned disc with its coned face presented toward said double-coned disc, and spring means urging said second coned disc toward said first coned disc.

8. In a device of the class described, a shaft, a coned disc fixed on said shaft and having an elongated hub projecting from the coned face thereof, a double-coned disc slidably but non-rotatably mounted on said hub and having a hub projecting therefrom away from said first disc, a second coned disc slidably but non-rotatably mounted on the hub of said double-coned disc with its coned face presented toward said double-coned disc, V-belts received in the grooves formed between said respective discs, and spring means bearing on said second coned disc and urging the latter, and, through the belt cooperating therewith, said double-coned disc, toward said first coned disc.

9. In a device of the class described, a shaft, a coned disc fixed on said shaft and having an elongated hub projecting from the coned face thereof, and beyond the end of said shaft, a double-coned disc slidably but non-rotatably mounted on said hub and having a hub projecting therefrom away from said first disc, at least one radial aperture in said first hub opening into the region occupied by the hub of said double-coned disc, a second coned disc slidably but non-rotatably mounted on the hub of said double-coned disc with its coned face presented toward said double-coned disc and having a hub projecting away from said double-coned disc, at least one radial aperture in the hub of said double-coned disc opening into the region occupied by the hub of said last-mentioned disc, V-belts received in the grooves formed between said respective discs, spring means bearing on said second coned disc and urging the latter, and, through the belt cooperating therewith, said double-coned disc, toward said first coned disc, and means for injecting lubricant into the interior of the hub of said first disc beyond the end of said shaft.

10. In a device of the class described, a shaft, a coned disc fixed on said shaft and having an elongated hub projecting from the coned face thereof, said hub being threaded at its outer end, a double-coned disc slidably but non-rotatably mounted on said hub and having a hub projecting therefrom away from said first disc, a second coned disc slidably but non-rotatably mounted on the hub of said double-coned disc with its coned face presented toward said double-coned disc, an abutment element threadedly mounted at the outer end of the hub of said fixed disc, and a spring sleeved on the hub of said fixed disc and confined between said abutment element and said second coned disc.

11. A speed varying unit comprising two substantially parallel shafts, a coned disc fixed on one of said shafts, at least one double coned disc slidably but non-rotatably mounted with respect to said one shaft, a coned disc slidably but non-rotatably mounted with respect to said one shaft, in facing relation to the adjacent face of that double-coned disc most remote from said fixed disc, means resiliently biasing all of said slidable discs toward said fixed disc, a plurality of V-belts, one received between each pair of adjacent discs and each formed with inclined lateral friction surfaces and with a substantially flat inner driving surface, a flat-faced pulley mounted on the other of said shafts, the inner surface of each of said belts having driving relation with said flat-faced pulley, and the sum of the lateral widths of the inner faces of all of said belts being narrower than the width of the flat-face of said pulley by an amount at least equal to the lateral movement of that belt most remote from said fixed disc.

12. In a device of the class described, two parallel shafts, a series of expansible V-pulleys mounted on one of said shafts, one coned face of each of said pulleys being formed on an element forming also a coned face of the next adjacent pulley, a plurality of V-belts, one received in the groove of each of said V-pulleys, and a series of non-expansible V-pulleys freely axially slidably mounted on said second shaft, one of said V-belts being received in the groove of each of said non-expansible V-pulleys, said V-belts providing driving connections between said expansible V-pulleys and said non-expansible V-pulleys.

PAUL B. REEVES.